April 6, 1926.
J. A. BALL ET AL
REGISTRATION OF COMPLEMENTAL IMAGES IN CINEMATOGRAPHY
Filed Feb. 4, 1922
1,579,806
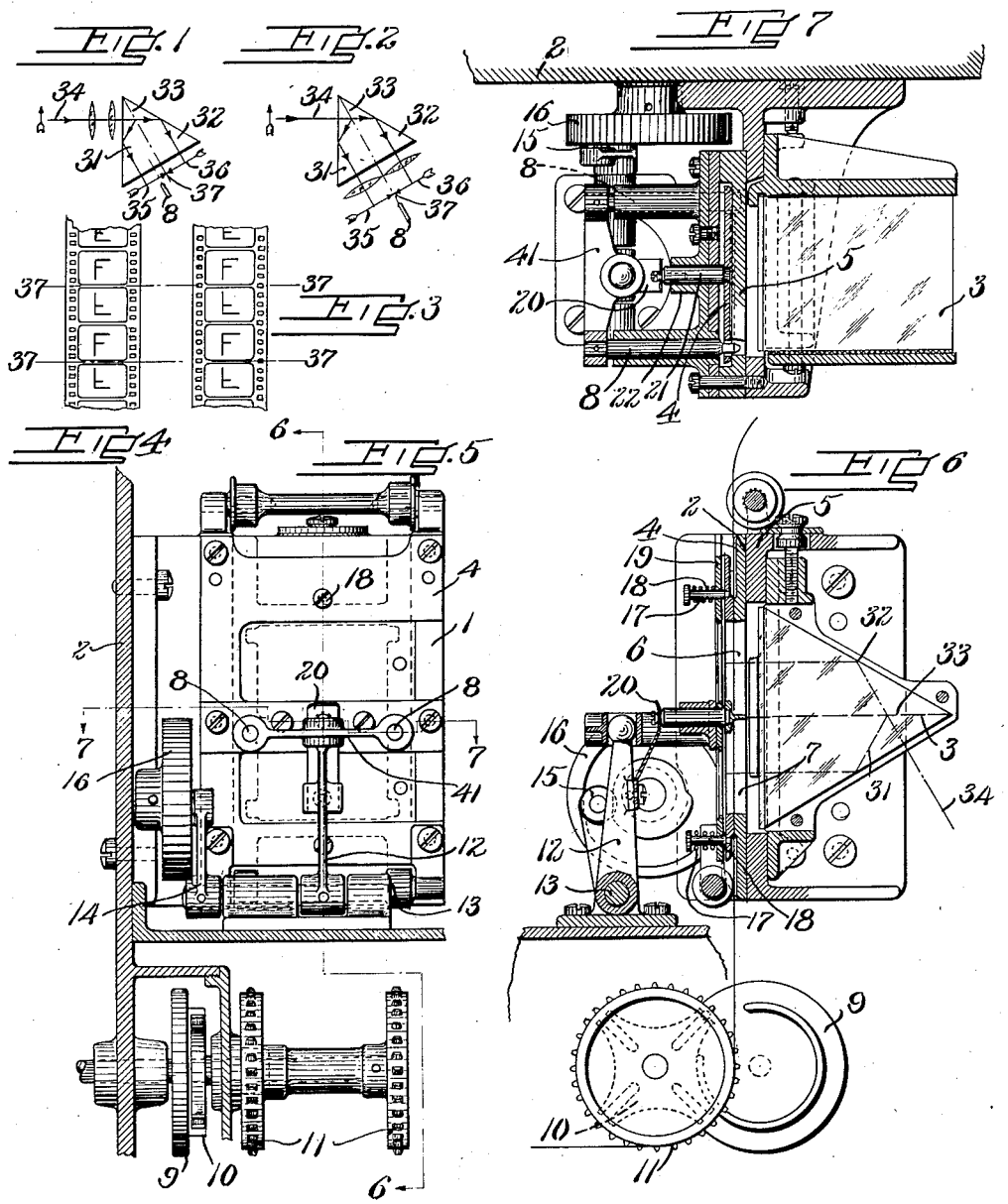
Inventors;
Joseph A. Ball,
Daniel F. Comstock,
by Roberts, Roberts & Cushman
their attys.

Patented Apr. 6, 1926.

1,579,806

UNITED STATES PATENT OFFICE.

JOSEPH A. BALL, OF WOLLASTON, AND DANIEL F. COMSTOCK, OF CAMBRIDGE, MASSACHUSETTS, ASSIGNORS, BY MESNE ASSIGNMENTS, TO TECHNICOLOR MOTION PICTURE CORPORATION, OF BOSTON, MASSACHUSETTS, A CORPORATION OF MAINE.

REGISTRATION OF COMPLEMENTAL IMAGES IN CINEMATOGRAPHY.

Application filed February 4, 1922. Serial No. 534,055.

*To all whom it may concern:*

Be it known that we, JOSEPH A. BALL and DANIEL F. COMSTOCK, both citizens of the United States of America, and residents of Wollaston and Cambridge, respectively, in the counties of Norfolk and Middlesex, respectively, and State of Massachusetts, have invented new and useful Improvements in Registration of Complemental Images in Cinematography, of which the following is a specification.

This invention relates to the art of color cinematography and more particularly to those processes of color cinematography where two or more color records of an object field are taken simultaneously and where these several color records are later superimposed by additive or subtractive method to reproduce the original scene and its colors.

One of the chief obstacles to the advancement of this art is the difficulty of registering the complemental images so taken. If there is lack of register of the recombined picture on the screen, the effect, while different from that due to lack of sharp focus, is just as destructive of the fine drawing of the picture. Consequently the limits of register are much the same as those of focus, and for motion picture work this should be not over .0005 inch.

The principal cause of registry difficulty is the shrinkage and expansion of the celluloid base of the film. Measurements show that motion picture film shrinks between one-tenth to one-quarter of one per cent in the developing process and subsequent drying. It continues to shrink on exposure to air at a rate varying from one-twentieth to one-thirtieth of one per cent per day. It is also affected by the humidity of the air and expands one-hundredth of one per cent for each degree of increase in humidity. These figures, viewed in the light of the limit in registration mentioned above, show that the possible condition of the film at the time of exposure, as well as subsequent shrinkages, must be provided for.

In the black-and-white art this shrinkage does not cause much trouble, because each picture is exposed printed and projected as a separate unit, and each picture space is individually positioned in the camera, in the printer, and in the projector by adjacent sprocket holes. Since the shrinkage of the film is recorded in these sprocket holes, it is eliminated and causes no trouble. At no time in the ordinary black-and-white process is the distance from one picture to the next determined by anything but the sprocket holes. But in systems of color cinematography where the two or more color records of the same scene are taken simultaneously, there is ordinarily an optical or mechanical factor which determines the distance between the two pictures. For example, if a camera with two lenses is used, there is the distance between the centers of the two lenses; or if a prism set is used behind one lens there is the displacement of the optical paths in the prisms, and while this displacement of the two pictures can be made to correspond accurately with the standard gauge of perforations as determined by the perforating machine, there can be no assurance that the film when exposed in the camera will be of this same length.

The aforesaid registry difficulty is not confined to camera operations but is met in printing positive films from negative films for either additive or subtractive use, in projecting additive images on a screen, in double-coated reproduction, in glueing films together with the complemental images in registry, in imbibition printing, and indeed in practically every branch of the color art at many stages subsequent to the exposure of the original negative.

It has been proposed to provide registering holes in the film adapted to be engaged by registering pins in the printer or projector, thereby accurately to position the images during printing or projection. However, as a film shrinks (or expands) the distance between the registering holes and the corresponding images obviously changes, and where there are a plurality of complemental images for each registering hole or pair of holes, the respective images of each complemental set being distributed along the film at different distances from the holes, these different distances change different amounts and thereby destroy or seriously impair the registering relationship between the registering holes and the respective images of the corresponding complemental set.

The object of the present invention is to provide a method and apparatus for registering complemental images accurately and substantially independently of shrinkage (or expansion) so that changes in the length of the film at any stage of its preparation or use have substantially no effect upon the registration of the respective complemental images.

According to this invention succeeding sections of the film are positioned by engagement with registering pins or the like at recurring points of the film and the complemental images are simultaneously formed in alignment longitudinally of the film with corresponding points of the images equidistant from transverse lines of the film bearing uniform relation to said points. The registering pins or the like engage openings in the film (sprocket holes or other openings) which are spaced along the film uniformly, and for most uses the complemental images are formed in such positions relative to the openings that the images and the openings are symmetrical relative to the same transverse lines of the film, that is, so that if the film be folded about the transverse lines both the images and the openings on opposite sides of the lines register. By forming the complemental images in reversed relationship to each other the images may be positioned not only in areas symmetrically located on opposite sides of said transverse lines but also with all corresponding points symmetrically positioned relative to said lines. Inasmuch as all corresponding points of the reversed images of the complemental sets are equidistant from their mid-lines it is evident that corresponding points of the complemental images shift equally with respect to their lines when the film shrinks or expands. Consequently if each series of images (comprising one image of each complemental set) be registered relatively to their lines the bad register effect of the change in length is automatically eliminated. By exposing the images of each complemental set at the same time and from the same point of view the images are geometrically identical and therefore susceptible of exact registration.

In forming the images in reversed relationship a unique advantage results from positioning the images so that the aforesaid positioning openings are symmetrically disposed relative to the transverse lines midway between the reversed images, that is, so that the mid-lines either bisect certain of the openings or bisect the spaces between adjacent openings (in either case of which the openings would register if the film be folded about the mid-lines). This advantage consists in that when the respective series of reversed images are printed on positive films in non-reversed relationship but in the same relation to the sprocket holes or other openings of the positives as the negative images bear to their sprocket holes, the sprocket holes of the positive films register when the films are superposed with their images in registery notwithstanding the positives are printed in non-reversed relation from reversed negatives. This is of particular significance in contact printing where the positives must bear the same relation to their sprocket holes as the negatives bear to their sprocket holes and will be evident from the following.

Considering the superposed positive films to have superposed transverse lines corresponding to each mid-line of the negatives, the sprocket holes adjacent the respective positives of each complemental set lie on the same side of the transverse lines of the set while the sprocket holes adjacent the respective negatives of each set lie on opposite sides of the mid-line of the set. Thus, in contact printing where the relationship between the images and the openings must be the same in the positive film as in the negative film, it is essential that the sprocket holes of the negative be symmetrical relative to the mid-lines in order for the openings of the superposed positive films to register, the registration requirements for the images and openings of the positives being the same as for the images and openings of the negatives if folded about their mid-lines.

Furthermore, the negative may be advanced in the same direction as the positive in printing one positive but in the direction opposite to the direction of positive feed in printing the other positive; and if the positioning openings are symmetrically located relatively to the aforesaid mid-lines the corresponding positioning openings of the respective positives will register when the positives are superposed in such relative position that the complemental images register.

Apparatus for practising the invention is characterized by a plurality of exposure openings, together with means for guiding the film past the openings in succession, also means for simultaneously exposing the film through the respective openings, and means for accurately positioning the film at the openings so that the images are formed thereon in predetermined position, the last means including positioning pins or the like recurrently engaging the film in uniform relation to transverse lines equidistant from the exposure openings. The optical system is arranged to form the complemental images in reversed relationship with respect to each other and the registering means is preferably positioned to engage the film either on the lines midway between the reversed images or at points displaced from the mid-lines distances equal to a one-half fraction (i. e. ½, 1½, 2½, etc.) of the spaces between the sprocket holes or other positioning openings.

In order to illustrate the application of the invention one concrete embodiment is shown in the accompanying drawings, in which,—

Fig. 1 is a diagram showing one form of optical system;

Fig. 2 is a similar view showing a modified optical system;

Figs. 3 and 4 are views of films produced by systems such as illustrated in Figs. 1 and 2, respectively;

Fig. 5 is an elevational view of portions of a camera embodying the present invention;

Fig. 6 is a section on line 6—6 of Fig. 5; and

Fig. 7 is a section on line 7—7 of Fig. 5.

The particular embodiment of the invention chosen for the purpose of illustration comprises a film gate 1 mounted on the casing 2 of a camera, a prism set 3 adjustably mounted on the front of the film gate, a pressure plate 4 movable forwardly and rearwardly to press the film against the forward plate 5 of the film gate, the latter having exposure openings 6 and 7 therein, registering pins 8 movable into and out of engagement with the sprocket holes of the film accurately to position the film, together with mechanism for actuating the positioning pins and for advancing the film through the film gate. The means for advancing the film may be of any suitable type, the type shown in the drawings comprising a pin wheel 9, a star wheel 10, and a sprocket wheel 11 arranged intermittently to advance the film two picture spaces at a time.

The mechanism for accurately positioning the film in the film gate comprises a yoke 41 which carries the registering pins 8, an oscillatory arm 12 for moving the yoke 41 to and fro, the arm 12 being fast on shaft 13 upon which is also fastened an arm 14 carrying at its free end a cam roll 15 engaging a cam 16. The movable pressure plate 4 is normally held out of engagement with the film by means of springs 17, surrounding pins 18, and bearing at their opposite ends against a stationary plate 19 and the heads of the pins 18. After the film has been advanced and positioned the pressure plate 4 is advanced into the position shown in Fig. 5 by means of a spring 20 on arm 12 operating upon the pressure plate through a pin 21 sliding in sleeve 22 on the stationary part of the film gate. The cam for actuating the registering pins is driven in synchronism with the film advancing mechanism by any suitable power means (not shown) so that after the film is advanced two picture spaces the registering pins 8 are advanced accurately to position the film in the film gate, and the pressure plate 4 is advanced to hold the film against the forward pressure plate 5. After the exposure has been made, the registering pins 8 and pressure plate 4 are first withdrawn and the intermitting pin and star wheels then advance the film two picture spaces.

When using positioning pins other than the film advancing pins or teeth and when using advancing means which are always in positive engagement with the film, the advancing means should be adjusted to advance the film only to a position slightly in the rear of its exposure position so that the positioning pins always move the film forwardly, thereby avoiding the injury to the film which might result if the positioning pins moved the film backwardly against the holding action of the advancing means.

The prism set 3 is similar to one of the sets disclosed in the pending application Serial No. 77,237 filed February 9, 1916, and comprises two similar right-angle prisms 31 and 32 (Figs. 1, 2 and 6) enclosing a light-dividing surface 33 therebetween. The objective lens may be placed either in front of the prisms as shown in Fig. 1 or behind the prisms as shown in Fig. 2. With the main beam of light entering the optical system along the line 34. The light is divided at the surface 33 into two similar beams which form complemental images at 35 and 36 in reversed relationship to each other, suitable filters being interposed in the paths of the divided beams to cause the respective images to represent complemental color aspects of the object-field. Thus the images of the successive complemental sets are reversed with respect to each other longitudinally of the film as shown in Figs. 3 and 4 and the images of each set are symmetrically arranged with respect to transverse lines 37 midway between the images of the respective sets.

As shown in Figs. 1, 2 and 6 the light-dividing surface 33 is positioned in a plane intersecting the film perpendicularly midway between the images formed on the film in the film gate. The positioning pins are preferably located either in this plane as shown in Fig. 2 or at a distance from this plane equal to half the distance between adjacent sprocket holes as shown in Figs. 1, 5, 6 and 7, the aforesaid effect of film shrinkage (or expansion) being more completely eliminated by locating the pins near said plane. With the positioning pins located as shown in Fig. 2 the lines of symmetry 37 of the film bisect the sprocket holes as shown in Fig. 4, whereas with the positioning pins located as shown in Fig. 1 said lines bisect the spaces between the sprocket holes as shown in Fig. 3.

By making one of the registering pins 8 substantially to fit the sprocket holes on one side of the film, and by making the registering pin on the other side narrower than the sprocket transversely of the film, slight changes in the transverse dimension of the film when the film shrinks or expands are accommodated so that the images may be accurately registered both transversely and longitudinally of the film in manipulating the film after it has been initially exposed, pins similar to those shown at 8 being suitable for use in the printer or projector or any other machine in which the film is subsequently to be employed.

I claim:

1. The method of recurrently registering succeeding sections of cinematographic film relative to a plurality of optical paths which comprises intermittently advancing the film into approximate registration with the optical paths and alternately engaging the film with a registering pin intermediate the axis of the optical paths.

2. The method of producing color motion pictures which comprises advancing a film along a predetermined path, recurrently positioning succeeding sections of the film by engagement with the film at recurring points, and simultaneously forming complemental images in alinement longitudinally of the film with corresponding points of the images equidistant from transverse lines of the film bearing uniform relation to said points.

3. The method of producing color motion pictures which comprises recurrently advancing succeeding sections of a film along a predetermined path by engagement with selected openings of a series of openings spaced uniformly along the film, simultaneously forming complemental images in alignment longitudinally of the film, and so positioning the film relative to the images that the images and the openings are symmetrical relative to the same transverse lines of the film at the instant of exposure.

4. The method of producing color motion pictures which comprises recurrently advancing succeeding sections of a film along a predetermined path by engagement with selected openings spaced uniformly along the film, simultaneously forming complemental images in reversed relationship relative to each other and in alignment longitudinally of the film, and positioning the film relative to the images that corresponding points of the reversed images and the openings are symmetrical relative to the same transverse lines of the film at the instant of exposure.

5. The method of producing color motion pictures which comprises recurrently advancing succeeding sections of a film along a predetermined path by engagement with selected openings of a series of openings spaced uniformly along the film, simultaneously forming complemental images in reversed relationship to each other, and so positioning the film relative to the images that the openings are symmetrically located relative to the mid-lines between the reversed images at the instant of exposure.

6. The method of producing color motion pictures which comprises recurrently advancing succeeding sections of a film along a predetermined path by engagement with selected openings of a series of openings spaced uniformly along the film, simultaneously forming complemental images in reversed relationship to each other, and so positioning the film relative to the images that the mid-lines between the reversed images bisect the spaces between adjacent openings.

7. A cinematographic camera for exposing a film with complemental images from the same point of view at the same time, comprising means having a plurality of exposure openings, means for guiding the film past said openings in succession, means for simultaneously exposing the film through said openings with complemental images which are reversed with respect to each other longitudinally of the film, and means near the mid-positions between said openings for positioning the portions of the film being exposed in the respective openings.

8. A cinematographic camera for exposing a film with complemental images from the same point of view at the same time, comprising means having a plurality of exposure openings, means for guiding the film past said openings in succession, means for simultaneously exposing the film through said openings with complemental images which are reversed with respect to each other longitudinally of the film, and means recurrently operative upon the film in uniform relation to transverse lines equidistant from the exposure openings for accurately positioning the portions of the film being exposed.

9. Apparatus of the character described for concomitantly forming a plurality of series of complemental images on the same side of a film, comprising means for advancing a film along a predetermined path, means for simultaneously forming complemental images on one side of the film, said last means including a light-dividing surface disposed in a plane intersecting said path, and means engaging selected openings of a series of openings in the film accurately to position the film while being exposed, said means being positioned relatively to said plane to position the film with said openings symmetrically positioned relatively to the plane.

10. Apparatus of the character described for concomitantly forming a plurality of series of complemental images on the same side of a film, comprising means for advancing a film along a predetermined path, means for simultaneously forming complemental images in reversed relationship on one side of the film, said last means including a light-dividing surface in a plane intersecting the film midway between the reversed images, said means engaging the film in a region defined by planes spaced from opposite sides of said plane distances approximately equal to half the distance between adjacent openings.

11. Apparatus of the character described for concomitantly forming a plurality of series of complemental images on the same side of a film, comprising means for advancing a film along a predetermined path, means for simultaneously forming complemental images in reversed relationship on one side of the film, said last means including a light-dividing surface in a plane intersecting the film midway between the reversed images, and means engaging selected openings of a series of openings in the film accurately to position the film while being exposed, said means engaging the film in a region defined by planes spaced from opposite sides of said plane distances approximately equal to half the distance between adjacent openings.

12. Apparatus of the character described for concomitantly forming a plurality of series of complemental images on the same side of a film, comprising means for advancing a film along a predetermined path, means for simultaneously forming complemental images in reversed relationship on one side of the film, said last means including a light-dividing surface in a plane intersecting the film midway between the reversed images, and means engaging selected openings of a series of openings in the film accurately to position the film while being exposed, said means engaging the film at a distance from said plane substantially equal to a one-half fraction of the distance between adjacent openings.

13. Apparatus of the character described for concomitantly forming a plurality of series of complemental images on the same side of a film, comprising means for advancing a film along a predetermined path, means for simultaneously forming complemental images in reversed relationship on one side of the film, said last means including a light-dividing surface in a plane intersecting the film midway between the reversed images, and means engaging selected openings of a series of openings in the film accurately to position the film while being exposed, said means engaging the film at a distance from said plane substantially equal to one-half the distance between adjacent openings.

14. Apparatus of the character described for concomitantly forming a plurality of series of complemental images on the same side of a film, comprising means for advancing a film along a predetermined path, means for simultaneously forming complemental images in reversed relationship on one side of the film, said last means including a light-dividing surface in a plane normal to the film midway between the reversed images, and means engaging selected openings of a series of openings in the film accurately to position the film while being exposed, said means engaging the film in a region defined by planes spaced from opposite sides of said plane distances approximately equal to half the distance between adjacent openings.

Signed by us at Boston, Massachusetts this 5th day of January, 1922.

JOSEPH A. BALL.
DANIEL F. COMSTOCK.